United States Patent [19]
Spruit et al.

[11] Patent Number: 5,282,095
[45] Date of Patent: Jan. 25, 1994

[54] DIRECT OVER-WRITE MAGNETO-OPTICAL RECORDING MEDIUM HAVING MULTIPLE RECORDING LAYERS, AND METHOD OF RECORDING NEW INFORMATION BY DIRECTLY OVERWRITING PRE-EXISTING RECORDED INFORMATION ON SUCH MEDIUM

[75] Inventors: Johannes H. M. Spruit; Bernardus A. J. Jacobs, both of Eindhoven, Netherlands

[73] Assignee: U.S. Philips Corporation, New York, N.Y.

[21] Appl. No.: 852,477

[22] Filed: Mar. 17, 1992

[30] Foreign Application Priority Data

Apr. 24, 1991 [EP] European Pat. Off. ........ 91200978.4

[51] Int. Cl.$^5$ ...................... G11B 13/04; G11B 11/12; G11B 11/10
[52] U.S. Cl. ........................................ 360/59; 369/13; 360/114; 365/122
[58] Field of Search ...................... 369/13, 14; 360/59, 360/114; 365/122; 428/694

[56] References Cited

U.S. PATENT DOCUMENTS

| | | | |
|---|---|---|---|
| 4,878,132 | 10/1989 | Aratani | 369/13 |
| 4,922,454 | 5/1990 | Taki | 369/13 |
| 5,069,984 | 12/1991 | Hatwar et al. | 369/13 |
| 5,105,400 | 4/1992 | Kikitsu | 369/13 |

FOREIGN PATENT DOCUMENTS

| | | |
|---|---|---|
| 0225141 | 6/1987 | European Pat. Off. . |
| 0304288 | 2/1989 | European Pat. Off. . |
| 59-215037 | 12/1984 | Japan ..... 369/13 |
| 01-241051 | 9/1989 | Japan ..... 369/13 |

Primary Examiner—Hoa Nguyen
Attorney, Agent, or Firm—Leroy Eason

[57] ABSTRACT

A magneto-optical recording medium on which new information can be directly over-written over pre-existing recorded information. Such medium comprises two magneto-optical recording layers which have a difference in Curie temperature in the range of 0° C. -25° C. and which are separated from each other by a metal layer for the transfer of heat, such as aluminum. Recording is effected by scanning the medium with a write spot produced by a pulsed laser beam concurrently with application of an external magnetic field which is modulated in accordance with the information to be recorded. The layers may have equal Curie temperatures if they behave thermally asymmetrically. At any scanning position of the write spot the scanned superposed local areas of the two recording layers are heated thereby above the Curie temperature of at least one of such layers and then permitted to cool while being subjected to the external magnetic field. This produces a frozen-in net magnetization in the scanned local area of one of the recording layers, which aids the external magnetic field in producing a similar frozen-in net magnetization of the superposed local area in the other recording layer. This allows use of a relatively weak external magnetic field, which is more economical and capable of operation at higher frequencies. Any pre-existing magnetization of the latter superposed local area is erased in consequence of magnetization thereof in accordance with the external magnetic field.

8 Claims, 2 Drawing Sheets

DIRECT OVER-WRITE MAGNETO-OPTICAL RECORDING MEDIUM HAVING MULTIPLE RECORDING LAYERS, AND METHOD OF RECORDING NEW INFORMATION BY DIRECTLY OVERWRITING PRE-EXISTING RECORDED INFORMATION ON SUCH MEDIUM

BACKGROUND OF THE INVENTION

1. Field of the Invention

The invention relates to an erasable magneto-optical recording medium comprising a substrate on one side of which there is provided a first magneto-optical recording layer having a first Curie temperature and a second magneto-optical recording layer having a second Curie temperature, such layers having an easy axis of magnetization perpendicular to the plane of the layer, superposed information bits in the form of magnetic domains being inscribable in both layers by a combination of irradiation with laser light and a modulated magnetic field.

The invention also relates to a method of simultaneously erasing existing information and inscribing new information in such a magneto-optical recording medium.

2. Description of the Related Art

In a MO (=magneto-optical) recording medium, data are represented by magnetized domains or bits. The direction of magnetization of the domains extends perpendicularly to the plane of the MO-recording layer. The bits can be detected by means of the MO-effect, which causes the direction of polarization of polarized light to change as a function of the direction of magnetization of the domains when such light is reflected from (Kerr-effect) or passed through (Faraday-effect) the layer.

The magnetized domains are obtained by locally heating the MO-recording layer by means of a focused laser light beam to a temperature above the Curie temperature of the material of the MO-recording layer. During cooling to a temperature below the Curie temperature, the magnetization is locally oriented according to the direction of an externally applied magnetic field and then becomes frozen-in. This method is also termed thermomagnetic recording. A customary manner of inscribing information in a MO-recording layer consists in rotating a disc-shaped recording medium while a permanent external magnetic field is applied. A laser light beam which is modulated according to the information to be recorded inscribe inscribes magnetic domains in the MO-recording layer. A disadvantage of said laser-modulation method is that the existing information cannot be directly overwritten with new information. The existing information must first be erased, by using a permanent magnetic field and a continuous laser light beam. A suitable method of directly overwriting existing information with new information (termed direct overwrite) is magnetic field modulation (MFM). In MFM it is the external magnetic field which is modulated according to the information to be recorded, the focused laser light beam having a constant power. The external magnetic field is generated by a magnet coil.

In the case of MO-recording using MFM, a MO-recording layer is desired whose direction of magnetization can change at weak magnetic fields, because this enables the dissipation of the magnet coil to be reduced and/or the distance of the magnet coil to the MO-recording layer to be enlarged. Technically, it is very difficult to generate a strong magnetic field having a high frequency (in the order of magnitude of 10 MHz).

In European Patent Application EP-A-225141 a description is given of such a magneto-optical recording medium which is suitable for direct overwriting. In said Application, use is made of two "exchange"-coupled MO-layers which have an opposite magnetization at temperatures between room temperature and the Curie temperature, so that the opposing demagnetizing fields are small and the MO-layer can be inscribed with a smaller external magnetic field. In this known MO-recording medium, both MO-layers have an opposite direction of magnetization. Also the superposed domains have opposite directions of magnetization.

A disadvantage of the known MO-recording medium resides in the fact that the technology used for the manufacture of the exchange-coupled MO-layers is difficult to control. Said MO-layers are provided on a substrate by means of vacuum evaporation or sputtering. The exchange-coupling acts over only a few interatomic distances, so that any contamination or oxidation of the first MO-layer substantially reduces the exchange-coupling with the second MO-layer.

SUMMARY OF THE INVENTION

It is an object of the invention to provide, inter alia, a MO-recording medium which is suitable for the "direct overwrite" of information and which is not based on the difficult technology of exchange coupling, but which is nevertheless magnetically sensitive, i.e. which can be inscribed and erased by using small external magnetic fields.

A further object of the invention is to provide a direct overwrite information recording method.

According to the invention, this object is achieved by a MO-recording medium as described in the opening paragraph, which medium is characterized in that the MO-layers are separated from each other by an intermediate layer for the transfer of heat, the difference in Curie temperature between the MO-layers is 0°–25° C., and the superposed domains have a similarly oriented net direction of magnetization. The intermediate layer separating both MO-layers has a suitable heat conduction and is, for example, a metal layer such as aluminum. Such intermediate layer also precludes exchange-coupling between the two MO-layers. As a result thereof, during recording with a laser light beam, both MO-layers will freeze magnetically at different times due to the difference in Curie temperature between the MO-layers. The MO-layer having the highest Curie temperature acts as the bias layer; the second MO-layer having the lower Curie temperature. During recording of a bit or domain using a focused laser light beam, both MO-layers are locally heated to a temperature above their Curie temperature. In said heated area the magnetization disappears. Meanwhile, said area is exposed to a magnetic field originating from a magnetic coil in the vicinity of said heated area. Due to the movement of the MO-recording medium relative to the laser light beam (a rotational movement in the case of a disc-shaped medium) the heated area cools down to a temperature below the Curie temperature of the bias layer and the magnetization of that layer is oriented according to the direction of the external magnetic field and subsequently becomes frozen-in. The corresponding area in the second MO-layer having the lower Curie temperature is then subject to both the external magnetic field of the magnet coil and to the magnetic field originating from the area whose magnetization has just been frozen-in. When the area in the second MO-layer cools further to a temperature below the Curie temperature, the magnetization of that area also becomes frozen. The superposed areas in both MO-layers have thus obtained a magnetization direction the same as that of the external magnetic field. In this manner, information can be inscribed in the second MO-layer by using a relatively weak external magnetic field, because said layer is also exposed to the field of the magnetization of the bias layer (=first MO-layer) which has just been frozen.

The advantage of the use of a weak external magnetic field is that it enables the size of the magnet coil to be reduced, thereby decreasing the heat dissipation of the coil and enabling said coil to be operated at higher frequencies. In addition, the distance between the coil and the MO-layer can be increased, so that the construction of the player is made simpler. Due to the relatively weak external field, not all the magnetic spins in the bias layer will be oriented in the direction of the external field; a part of the magnetic spins will still be oppositely oriented, yet, the net direction of magnetization is the same as that of the external magnetic field. After recording information the MO-layers contain domains, such that the domains of the first MO-layer (bias layer) adjoining the domains of the second MO-layer have the same direction of magnetization. Both MO-layer contain identical information. Such a MO-recording medium can be read from two sides, namely from the substrate side if the substrate is transparent to the wavelength of the laser light used, and also from the opposite side (so-called air incident).

Rare earth transition metal alloys such as GdTbFe and TbFeCo can be used as the material for the MO-layers. Multilayers such as Co/Pt or Co/Pd can also be used. A difference in Curie temperature can easily be achieved, for example, by changing the composition or the partial nitrogen pressure during the sputtering of such layers. The Curie temperature of such a MO-material is preferably selected in the temperature range 150°–250°.

The necessary thickness of the intermediate layer depends on, inter alia, the heat conduction coefficient of the material used. If aluminium is used, a suitable thickness is approximately 20 nm.

When selecting the material for the bias layer it is important that, if there is a point of compensation in the bias layer, this point is not exceeded before the second MO-layer is frozen. The point of compensation of a MO-material is the temperature at which the magnetization is zero and at which the direction of magnetization above and below said temperature is different. For both MO-layers the point of compensation is preferably selected close to room temperature, which has the additional advantage that the magnetization curve as a function of the temperature has a steep variation just below the Curie temperature, which results in a relatively large magnetic field of the bias layer.

It is alternatively possible to use two MO-layers having the same Curie temperature if the structure of the MO-recording medium behaves in a thermally asymmetric manner. In this case, the MO-layer will cool most rapidly on the side having the highest heat conduction and, thus, serve as the bias layer. Even a thermally symmetric MO-recording medium will behave thermally asymmetrically because the laser light is absorbed mainly in one MO-layer. Usually, the MO-layers are bounded by materials having a different heat conduction, such as the substrate and a protective lacquer, respectively.

The invention is not limited to only two MO-layers. If the bias layer is enclosed between two MO-layers having a Curie temperature below that of the bias layer, the bias layer will reduce the required field for both of the other two MO-layers.

It is also possible to additionally increase the magnetic sensitivity by using, for example, three MO-layers having a successively increasing Curie temperature. The layer having the highest Curie temperature then acts as the bias layer for the layer having the middle Curie temperature and both layers subsequently act as bias layers for the layer having the lowest Curie temperature. When more than two MO-layers are used the layer becomes more complicated and thermally less sensitive.

A suitable difference in Curie temperature is, for example, 8° C. At a difference in excess of 25° C., the adverse effect of spot widening occurs in the MO-layer having the lowest Curie temperature because a certain domain size inscribed in the bias layer results in a larger domain size in the layer having the lowest Curie temperature.

Exposure to the focused laser light beam is preferably carried out through the substrate. In this case, the usually disc-shaped substrate must be transparent to the wavelength of the laser light used. Thus, it is precluded that any dust particles or other impurities present on the surface of the substrate adversely affect the quality of recording and reading because said impurities are remote from the focal point of the objective used to focus the light beam on the MO-layers. The transparent substrate is manufactured from, for example, glass, quartz or a transparent synthetic resin such as polycarbonate or polymethyl methacrylate. The surface of the substrate at the side of the MO-layers may be provided with an optically scannable groove, a so-called servo track or guide track, which is generally spiral-shaped. It is alternatively possible to use a replication process to provide the groove in a separate synthetic resin layer applied to the substrate, which layer consists of, for example, a UV light-cured layer of acrylates. The MO-layer is applied on top of said layer. The outermost MO-layer is shielded from its surroundings by a protective layer of, for example, UV light-cured acrylate.

Inorganic dielectric layers, so-called tuning layers, may be present between a MO-layer and the substrate and between the (second) MO-layer and the protective layer. Many of the layers used consist of metal nitride such as aluminium nitride and silicon nitride. Such layers also serve to protect the MO-layers.

Amorphous rare earth transition metal alloys used as the material for the MO-layers, such as GdTbFe and TbFeCo, can be obtained in several ways, such as vacuum evaporation, RF and DC diode and magnetron sputtering. Preferably, a sputter process is used in which the pressure is increased from an initial value of less than approximately $10^{-6}$ mbar to $10^{-3}$ mbar during sputtering with an inert gas. During the deposition process a magnetic field may be used having a field strength of, for example, 160 kA/m (2000 Oe) which extends perpendicularly to the plane of deposition.

The recorded domains or bits are read magneto-optically by means of a continuous, linearly polarized laser light beam of low intensity which is focused on the MO-layers. As a result of magnetization, the plane of polarization of the light beam is rotated at the location of a bit through a certain angle which can be established and measured by means of a detector. The rotation of the plane of polarization takes place with both a reflected light beam, the rotation then being termed Kerr-rotation, and with a passed beam, in which case it is termed Faraday-rotation.

The invention further relates to a method of simultaneously erasing existing information and inscribing new information (termed direct overwrite) in a disc-shaped MO-recording medium as described hereinbefore. In such method the magneto-optical recording medium is rotated and the magneto-optical recording layers are locally heated by exposure to a write spot which is moved diametrally across the medium and which originates from a laser light beam which is focused on the magneto-optical recording layers, while an external magnetic field which is modulated according to the information to be recorded is present at the location of the write spot and is oriented predominantly perpendicularly to the magneto-optical recording layers. The local magnetization of the first magneto-optical layer having the highest Curie temperature will become oriented in the direction of the external magnetic field, whereas in an adjoining area of the second magneto-optical recording layer having the lowest Curie temperature the magnetization is zero. The magnetization in the first magneto-optical recording layer becomes frozen-in by cooling, forming a first information bit. The magnetization of said adjoining area of the second magneto-optical recording layer subsequently becomes oriented under the influence of both the external magnetic field and the frozen-in magnetization of the adjoining information bit of the first magneto-optical recording layer, said magnetization then becoming frozen-in by cooling, thus forming a second information bit having a direction of magnetization the same as that of the adjoining first information bit in the first magneto-optical recording layer.

The linear velocity of the MO-recording medium is governed by the type of information to be recorded, such as audio, video or data information and is, for example, 1 to 20 m/s. During recording, the exposed areas of the MO-recording layers are heated to a temperature above or close to the Curie temperature, after which a magnetic domain or bit is formed in both MO-recording layers by cooling, said domain or bit having a direction of magnetization which corresponds to the external magnetic field. Said external magnetic field originates from a magnet coil which is modulated in accordance with the information to be recorded with a frequency in the MHz range. The bits formed have small diametral dimensions of maximally one or a few micrometers so that a high information density is obtained.

The recorded information is read, as described hereinabove, by using linearly polarized laser light having a low power and reading is based on the magneto-optical effect (Kerr or Faraday effect). As explained hereinabove, both MO-recording layers contain identical information, i.e. magnetically equally oriented superposed domains, so that the recording medium can be read from two sides (so-called air incident and substrate incident).

It is noted, that in European Patent Application EP-A-304288 a description is given of a MO-recording medium which is suitable for direct overwriting. Recording and simultaneously erasing is carried out by means of laser modulation in which the laser is switched between two power levels. During recording and erasing the temperature of the bias layer surpasses the compensation point of the bias layer. The compensation point of the bias layer is above room temperature, so that after cooling to room temperature the magnetization of the bias layer has the same orientation again as before the recording process. Before and after the recording process, the magnetization of the bias layer is uniformly oriented and, hence, contains no information at all. In that case, double-sided reading of such a medium is impossible. The Curie temperature of the bias layer is very high: see FIG. 2B (magnetization of bias layer still 100 G at 300° C.)

BRIEF DESCRIPTION OF THE DRAWINGS

The invention will be explained in greater detail by means of an exemplary embodiment and drawings, in which.

DESCRIPTION OF THE PREFERRED EMBODIMENTS

Figure 1:
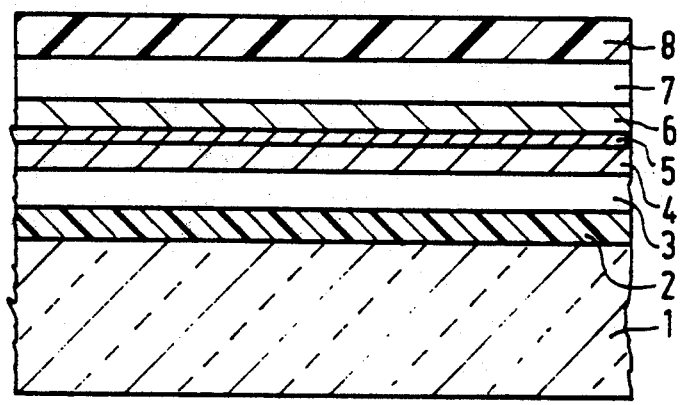
FIG. 1 is a diagrammatic cross-sectional view of a MO-recording medium, FIG. 2 diagrammatically shows the principle of direct overwrite according to the invention.

Reference numeral 1 in FIG. 1 denotes a glass substrate. The substrate has the shape of a disc having a diameter of 12 cm and a thickness of 1.2 mm. The surface of substrate 1 is provided with a layer 2 of a UV light-cured acrylate synthetic resin in which a spiral-shaped groove (not shown) is formed by means of a replication process which is known per se. A dielectric AlN-layer 3 having a thickness of 80 nm is sputtered onto layer 2. Using a GdTbFe sputter target a first MO-recording layer 4 having a thickness of 45 nm is sputtered onto layer 3. The layer 4 obtained has the following composition $Gd_xTb_yFe_z$ (where x=17; y=8 and z=75 at.%). The Curie temperature of this layer is approximately 180° C. An aluminium layer 5 having a thickness of 20 nm is sputtered onto layer 4. Using another GdTbFe target a second MO-recording layer 6 having a thickness of 45 nm is sputtered onto layer 5. The layer 6 obtained has a composition in which x=15; y=10 and z=75 at.%. The Curie temperature of layer 6 is 8° C. below that of layer 4. A dielectric AlN-layer 7 having a thickness of 80 nm is sputtered onto layer 6. Layer 7 is covered with an acrylate protective layer 8 which is cured by UV radiation.

Figure 2A:
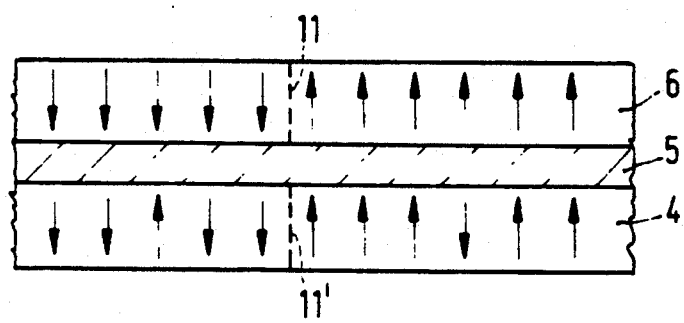
Figure 2B:
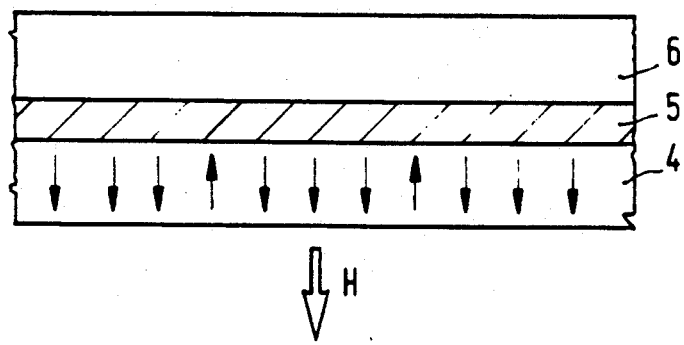
Figure 2C:
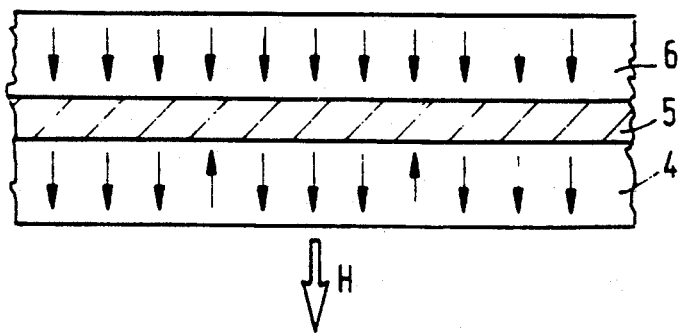

FIG. 2 shows the principle of direct overwrite according to the invention. Layer 4 is a part of the MO-recording layer having the highest Curie temperature, and layer 6 is a part of the MO-recording layer having the lowest temperature. Layer 5 is a part of the aluminum intermediate layer. The arrows in the layers indicate the directions of magnetization in the layers. In FIG. 2a both layer 4 and layer 6 contain previously recorded information. Broken lines 11 and 11' indicate the respective domain walls. Parts of information bits are shown on the left and the right side of said domain walls. Subsequently, a focused laser light beam pulsed at a constant frequency is directed to the MO-recording layers so that the temperature locally rises to a level close to the Curie temperature of layer 4 and above the Curie temperature of layer 6. As a result thereof, the magnetization of layer 6 disappears locally (FIG. 2b). An external magnetic field H which is relatively weak at that moment is directed, for example, downwards and is generated by a magnet coil which is modulated in accordance with the information to be recorded. In layer 4, the magnetization is locally largely directed downwards (see FIG. 2b) by said relatively weak external magnetic field H. The magnetization in layer 4 is frozen-in by cooling after which further cooling leads to a reduction of the temperature in layer 6 to below the Curie temperature of said layer. Thus, the area in said layer 6 is subject to both the external magnetic field H and the frozen-in magnetization of layer 4, which directions of magnetization are both oriented downwards. Consequently, the magnetization in layer 6 is subsequently oriented downwards. The direction of magnetization of layer 6 locally corresponds to the net direction of magnetization of layer 4. After recording, MO-layer 4 and MO-layer 6 contain identical information, so that the MO-recording medium can be read from two sides. Due to the weak external magnetic field H the magnetization of the information bits in layer 4 is not fully oriented according to the external magnetic field, consequently said MO-layer 4 will exhibit more noise during reading. In general this is no unsurmountable problem for data storage. During the direct overwrite process, MO-layer 4 (having the highest Curie temperature) has served as the bias layer.

It has been found that this MO-recording medium can be manufactured so that it has a very satisfactory CNR(=Carrier to Noise Ratio). The CNR is a measure of the quality of the MO-recording medium. A CNR of 48 dB, measured at a carrier frequency of 1 MHz, a linear disc velocity of 5 m/s and a bandwidth of 30 kHz is sufficient for data-storage applications. Video-information requires 55 dB.

Figure 3:
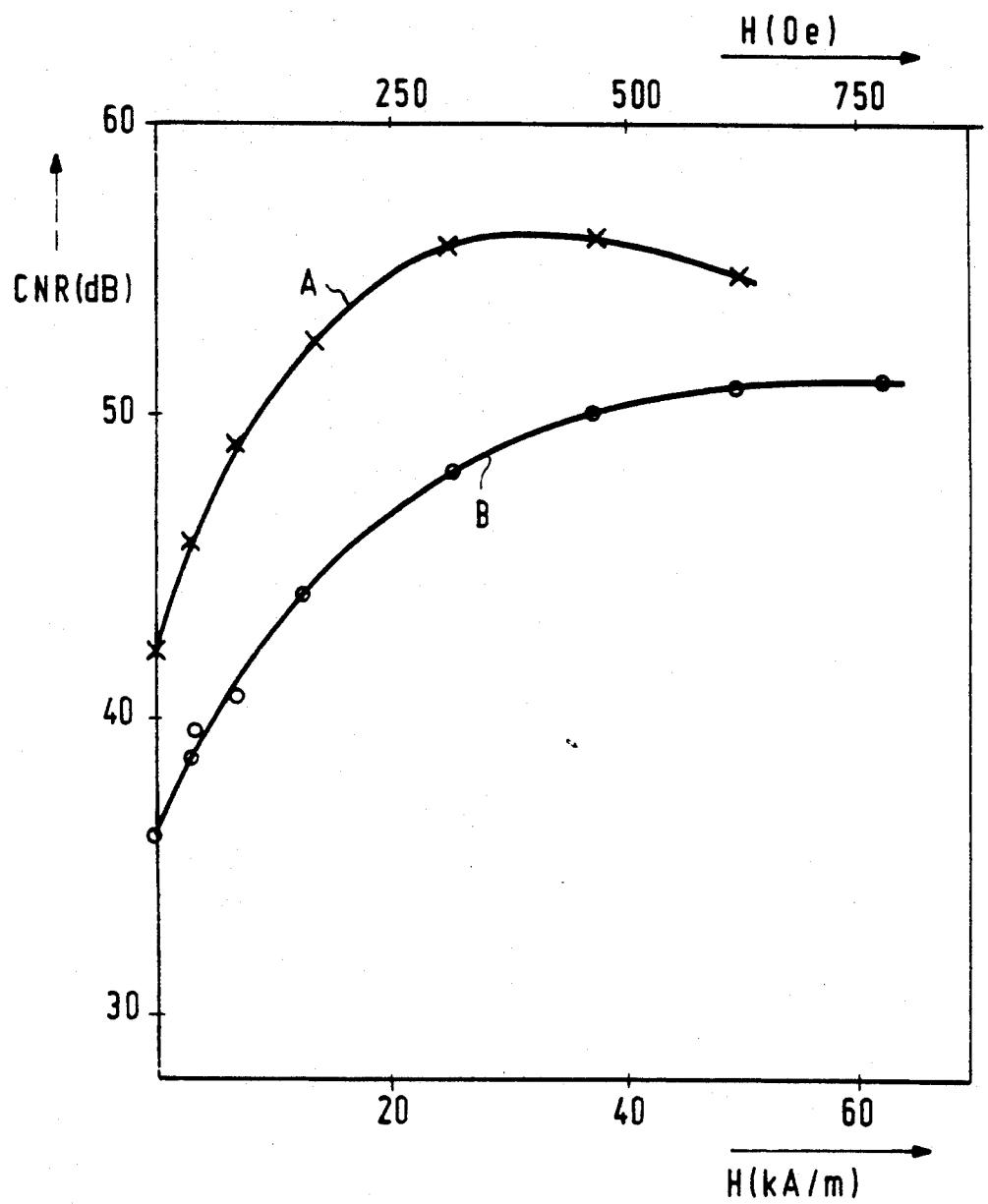
FIG. 3 shows the CNR as a function of the external magnetic field of the MO-recording layer having the highest Curie temperature (curve B) and the lowest Curie temperature (curve A).

In FIG. 3, the CNR is plotted as a function of the external magnetic field H for the type of MO-recording medium described. Curve A relates to MO-layer 6 (having the lowest Curie temperature), curve B relates to MO-layer 4 (having the highest Curie temperature). In this example the difference in Curie temperature is 8° C. It is obvious from the drawing that MO-layer 6 (having the lowest Curie temperature) reaches the maximum value much sooner than MO-layer 4. Layer 4 reaches the maximum CNR at an external field of 50 kA/m (600 Oe), whereas layer 6 already reaches the maximum CNR at approximately 25 kA/m (300 Oe). This is caused by the fact that MO-layer 6 is subject to both the external field and the field of MO-layer 4.

We claim:

1. A magneto-optical recording medium on which new information can be directly recorded over pre-existing recorded information, such recording effecting erasure of the pre-existing recorded information; said recording medium comprising:

a first magneto-optical recording layer having a first Curie temperature and a second magneto-optical recording layer having a second Curie temperature, said recording layers being separated from each other by an intermediate metallic layer for the transfer of heat;

each of said recording layers having an easy axis of magnetization perpendicular to the plane thereof, successive information bits in the form of magnetic domains being inscribable in successive superposed local areas of said recording layers by successively heating the successive superposed local areas with a beam of laser radiation while being subjected to a modulated external magnetic field;

the difference between said first and second Curie temperatures being within a range of 0°–25° C., and the magnetic domains formed in any superposed local areas of said recording layers when information bits are inscribed therein having a similarly oriented net direction of magnetization.

2. A magneto-optical recording medium as claimed in claim 1, characterized in that the intermediate layer is a metal layer.

3. A magneto-optical recording medium as claimed in claim 2, characterized in that the intermediate layer is of aluminium.

4. A magneto-optical recording medium as claimed in claim 3, characterized in that the intermediate layer has a thickness of 20 nm.

5. A magneto-optical recording medium as claimed in claim 1, characterized in that the material of the magneto-optical layers is selected from the group consisting of TbFeCo and GdTbFe.

6. A magneto-optical recording medium as claimed in claim 1, characterized in that the first and the second Curie temperature are equal and the magneto-optical recording layers are bounded by materials having a different heat conduction.

7. A magneto-optical recording medium as claimed in claim 1, further comprising a third magneto-optical recording layer having a Curie temperature which is equal to that of the first magneto-optical recording layer, the second magneto-optical recording layer being located between the first and the third magneto-optical recording layers, and the Curie temperature of the second magneto-optical recording layer being higher than that of the first and the third magneto-optical recording layers.

8. A method of recording new information over pre-existing recorded information on a magneto-optical recording medium, such recording effecting erasure of the pre-existing recorded information; said method consisting of the steps of:

providing a recording medium comprising first and second magneto-optical recording layers respectively with first and second Curie temperatures being within the range of 0°–25° C.

scanning the recording medium with a write spot of radiation which is pulsed at a constant frequency, so that superposed successive local areas of both recording layers are successively heated by said write spot and then permitted to cool, the heating of such local areas being to a temperature which at least exceeds said second Curie temperature;

concurrently with scanning by said write spot, subjecting the superposed successive local areas of said layers to an external magnetic field which is modulated in accordance with the information to be recorded and oriented in a direction predominantly perpendicular to said recording layers; thereby producing a net magnetization of the scanned local area in said first recording layer in a direction corresponding to that of the external magnetic field and erasing any pre-existing magnetization of the superposed local area in said second recording layer;

the magnetization of the scanned local area in said first recording layer becoming frozen-in upon cooling thereof, thereby forming a recorded information bit therein;

the combination of said external magnetic field and the magnetic field produced by the frozen-in magnetization of the scanned local area of said first recording layer producing a net magnetization of the superposed local area in said second recording layer in the same direction as that of the external magnetic field; the net magnetization so produced in said superposed local area of said second recording layer becoming frozen-in upon cooling thereof below said second Curie temperature, thereby forming a recorded information bit therein which is the same as that in the superposed local area of said first recording layer.

* * * * *